No. 872,724. PATENTED DEC. 3, 1907.
E. M. GERRY.
SYSTEM OF DISTRIBUTION.
APPLICATION FILED OCT. 19, 1905.
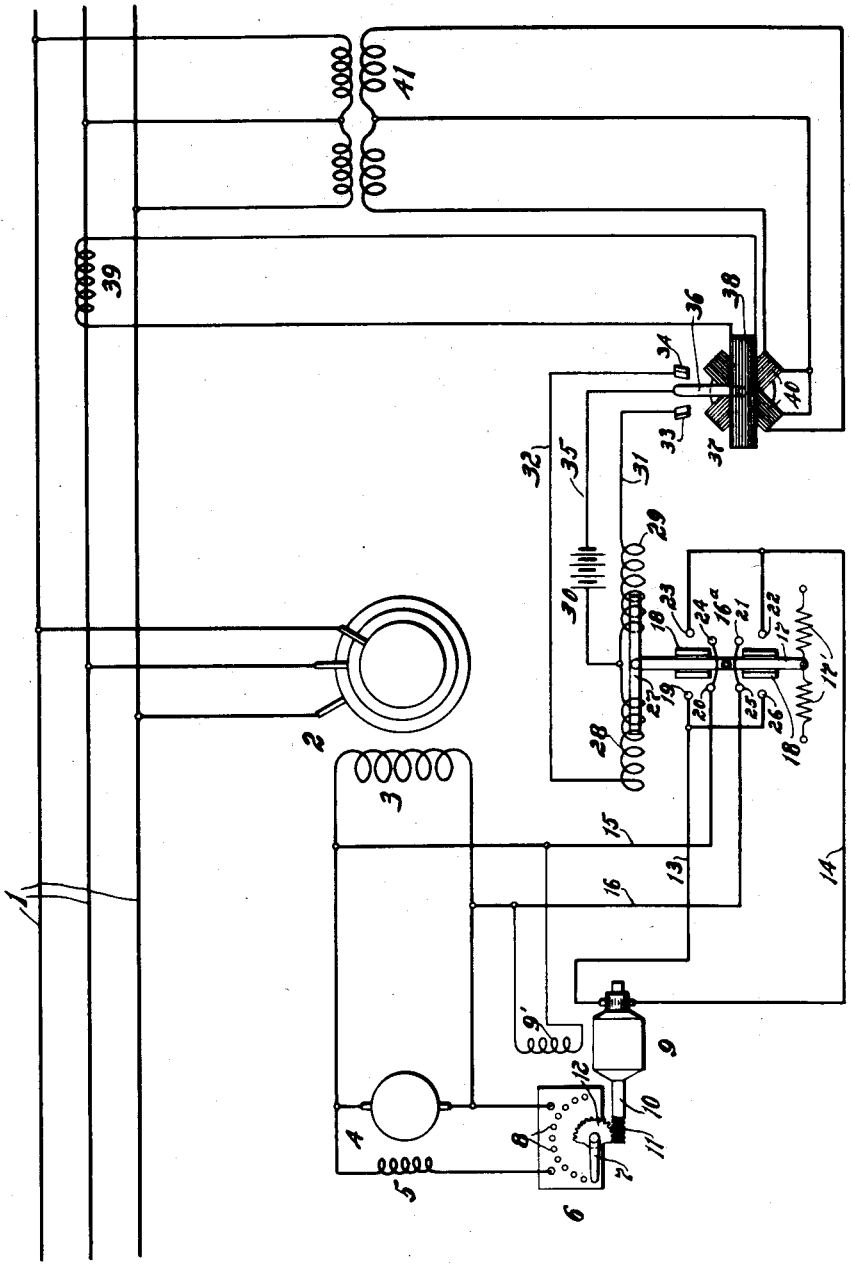
Witnesses:
George J. Schwartz.
Fred J. Kinsey.
Inventor:
Edward M. Gerry.
By
Chas. E. Lord
Attorney.

UNITED STATES PATENT OFFICE.

EDWARD M. GERRY, OF NORWOOD, OHIO, ASSIGNOR TO THE BULLOCK ELECTRIC MANUFACTURING COMPANY, A CORPORATION OF OHIO.

SYSTEM OF DISTRIBUTION.

No. 872,724.      Specification of Letters Patent.      Patented Dec. 3, 1907.

Application filed October 19, 1905. Serial No. 283,531.

*To all whom it may concern:*

Be it known that I, EDWARD M. GERRY, a citizen of the United States, residing at Norwood, in the county of Hamilton and State of Ohio, have invented certain new and useful Improvements in Systems of Distribution, of which the following is a full, clear, and exact specification.

My invention relates to alternating current systems of distribution in which the phase relation between the current and electromotive force is regulated by a synchronous regulator such as a synchronous motor or rotary converter, and especially to the automatic means for regulating the field magnetization of such synchronous controller.

It is well known that by varying the field excitation of a synchronous motor connected to a distributing system, the power factor of the system can be maintained constant.

The object of my invention is to provide an improved means for automatically regulating the field excitation of the synchronous machine in response to a change in the power factor of the circuit to maintain the power factor constant.

In carrying out my invention I employ a power factor meter or indicator for controlling the field excitation of the synchronous machine.

From a more specific standpoint, my invention consists in a system of alternating current distribution having connected thereto a synchronous machine adapted to be run without load for maintaining constant the power factor in the system of distribution, an exciter for said synchronous machine having an adjustable resistance in its field circuit, a motor for cutting in or out more or less of said resistance on a change of power factor, and a power factor meter connected to the system of distribution and responsive to changes in the power factor of the system for regulating the direction and degree of rotation of the motor, hence the amount of resistance in the exciter field circuit, and the field excitation of the synchronous machine.

Referring now to the accompanying drawing which represents diagrammatically a portion of an alternating current distributing system having my invention applied thereto, I have shown at 1 the conductors of a three-phase system of distribution, to which a number of feeding generators and translating devices, both of which are not shown, may be connected. Connected to the main conductors 1 is a synchronous machine 2, in this case a synchronous motor, which is preferably adapted to run on no load or a light load. The field 3 of this motor is energized by an exciter 4, in circuit with the field 5 of which is a rheostat 6, having an arm 7 which is adapted to engage contacts 8. Ordinarily, when there is inductance in the main distributing circuit the motor will be overexcited to produce a condenser effect.

The amount of resistance in the field circuit of the exciter is regulated by a small auxiliary motor 9 on the shaft 10 on which is a worm 11 adapted to engage a gear 12 connected with the controlling arm of the rheostat. This motor is adapted to run in both directions so that the arm of the rheostat can be moved either to the right or to the left depending upon the condition of the current in the distributing system. I have in this case shown the auxiliary motor as supplied with current from the exciter circuit but it is evident that a separate source of current could be employed for this purpose. The brushes of the motor are connected by conductors 13 and 14 to conductors 15 and 16 connected to the exciter circuit through a double-throw reversing switch 16ª. The switch 16ª comprises a pivoted arm 17, carrying four contact blades 18, and eight stationary contacts adapted to be engaged by the contact blades. Contacts 19—20 and contacts 21—22 are adapted to be connected when the switch is moved in one direction and contacts 23—24 and 25—26 are adapted to be connected when the switch is moved in the opposite direction. It is seen that when the switch is in one position conductor 13, connected to one brush of the motor 9 is connected to conductor 15 and to one side of the exciter circuit and that conductor 14, connected to the other brush motor, is connected to conductor 16 and to the other side of the exciter circuit. When the position of the switch is changed, it is seen that the armature connections will be reversed and hence by changing the switch from one position to the other, the current to the motor armature will be reversed. I have in this case shown the field 9' of the motor 9 connected permanently to the conductors 15 and 16. Normally when the power factor in the distributing circuit is constant the switch 16ᵃ will be held in its inoperative position by springs 17'.

The position of the switch is adapted to be controlled by a power factor meter on a change of the power factor of the main distributing system. Connected to one end of arm 17 is an arm 27 arranged at right angles thereto and adapted to be operated by solenoids 28 and 29. The solenoids are connected at one end to one side of a battery 30 and at their other ends by conductors 31 and 32 to stationary contacts 33 and 34, respectively. The other side of the battery is connected by conductor 35 to an arm 36 of a power factor meter 37. Arm 36 is adapted to engage the contacts 33 and 34 to close the circuits through the solenoids 28 and 29 respectively and hence to operate the reversing switch upon a change of power factor in the main distributing circuit.

The power factor meter 37 may be an ordinary standard instrument having a stationary coil 38 and one or more movable coils 40. The stationary coil is in this case the current coil and is connected by transformer 39 to one of the conductors of the distributing circuit. The two movable coils are connected by a transformer 41 across the mains of the distributing system. The arm 36 of the instrument may be the ordinary indicating needle or may be an auxiliary arm connected to the movable spindle in any suitable manner. As the construction of a standard power factor meter is well known no further description of the latter is thought to be necessary. As the power factor of the main distributing circuit is increased or decreased the position of the movable coils will be changed and the arm 36 will be moved either to the right or to the left depending upon whether the power factor has been increased or decreased.

The operation of my invention is as follows: When the power factor of the main distributing circuit is constant the arm of the power factor meter will be out of engagement with either of the contacts 33 and 34. The switch 16ᵃ, therefore, will be held in its intermediate position by the springs 17' the armature circuit of motor 9 will be open and said motor will be stationary. If the power factor of the distributing circuit tends to change, thereby causing the arm 36 to be moved into engagement with either contact 33 or 34, a circuit will be completed through the battery and one of the solenoid coils. The switch 16ᵃ will be moved either to the right or to the left to complete the circuit through the motor 9. Accordingly the rheostat arm will be moved to the right or the left increasing or decreasing the resistance in the field circuit of the exciter depending upon the direction of rotation of the motor 9. If the power factor of the system is decreased, on account of added inductance in the load, the small motor will be rotated in the direction to decrease the resistance of the exciter field and hence to increase the field magnetization of the synchronous motor to increase its condenser action and hence to compensate for the added inductance and the lagging current of the main system. If the power factor is increased the small motor will be moved in a direction to increase the resistance of the exciter circuit to decrease the field magnetization of the synchronous motor to decrease its condenser action. Therefore, it will be seen that the power factor of the main distributing system will be kept practically constant, the slightest change of the power factor being immediately compensated for by the change in the field magnetization of the synchronous motor which changes the condenser action of the motor.

I do not wish to be confined to the specific details shown or to the specific arrangements of the circuits but I aim in my claims to cover all modifications which do not depart from the spirit of my invention.

What I claim as new and desire to secure by Letters Patent is:—

1. An alternating current system of distribution, a synchronous dynamo electric machine connected thereto and adapted to maintain the power factor thereof constant, an exciter for said machine, and means responsive to a change in the power factor of the system for changing the resistance in the field circuit of the exciter.

2. An alternating current system of distribution, a synchronous dynamo electric machine connected thereto for maintaining constant its power factor, an exciter for said synchronous machine, a variable resistance in the field circuit thereof, an auxiliary motor for regulating the resistance in the exciter field circuit, and means responsive to a change in the power factor of the system for controlling the action of the auxiliary motor.

3. An alternating current system of distribution, a synchronous dynamo electric machine connected thereto for maintaining constant its power factor, an exciter for said synchronous machine, a variable resistance in the field circuit of said exciter, an auxiliary motor for controlling the amount of resistance in the field circuit, and means reponsive to a change in the power factor of the system for controlling the direction and degree of rotation of the auxiliary motor.

4. An alternating current system of distribution, a synchronous dynamo electric machine connected thereto for maintaining constant its power factor, an exciter for said synchronous machine, a variable resistance in a circuit of said exciter, an auxiliary motor for controlling the amount of resistance in said exciter circuit, a reversing switch for reversing the connections of the auxiliary motor to its source of supply, and means responsive to the change in the power factor of the system for controlling the reversing switch.

5. An alternating current system of distribution, a synchronous dynamo-electric machine connected to said system for maintaining constant its power factor, an exciter for said machine, and means responsive to changes in either the potential or current of said system for controlling the resistance in a circuit of the exciter.

6. An alternating current system of distribution, a synchronous dynamo electric machine connected to said system and adapted to maintain its power factor constant, an exciter for said machine, and a power factor meter or indicator responsive to changes in the power factor of said system for controlling the resistance in the field circuit of the exciter.

7. An alternating current system of distribution, an overexcited synchronous dynamo electric machine connected to said system for maintaining its power factor constant, an exciter for said synchronous machine, a variable resistance in the field circuit of the exciter, an auxiliary motor for regulating the resistance in the exciter field circuit, and a power factor meter or indicator connected to the distributing system and responsive to changes in the power factor of said system for controlling the action of the auxiliary motor.

8. An alternating current system of distribution, a synchronous dynamo electric machine connected thereto for compensating for a change in the power factor thereof, an exciter for said synchronous machine having a variable resistance in its field circuit, an auxiliary motor normally stationary but adapted to be rotated to control the amount of resistance in the field circuit, and a power factor meter connected to the distributing system and responsive to changes in the power factor of said system, and means whereby said meter controls the direction and the degree of rotation of the auxiliary motor.

9. An alternating current system of distribution, a synchronous dynamo electric machine connected thereto for compensating for any changes in the power factor thereof, said machine being arranged to run without load and being normally overexcited, an exciter for said machine having a variable resistance in its field circuit, an auxiliary motor for changing the resistance in said field circuit, and a power factor meter or indicator connected to the distributing system and responsive to changes in the power factor of said system, and means whereby said meter controls the direction and degree of rotation of the auxiliary motor.

In testimony whereof I affix my signature, in the presence of two witnesses.

EDWARD M. GERRY.

Witnesses:
 FRED J. KINSEY,
 ARTHUR F. KWIS.